US012687647B2

(12) United States Patent
Tapie

(10) Patent No.: US 12,687,647 B2
(45) Date of Patent: Jul. 21, 2026

(54) TEMPERATURE COMPENSATION FOR PHOTOMULTIPLIER TUBE

(71) Applicant: CBG Corporation, Austin, TX (US)

(72) Inventor: William Tapie, Leander, TX (US)

(73) Assignee: CBG Corporation, Austin, TX (US)

( * ) Notice: Subject to any disclaimer, the term of this patent is extended or adjusted under 35 U.S.C. 154(b) by 122 days.

(21) Appl. No.: 18/644,576

(22) Filed: Apr. 24, 2024

(65) Prior Publication Data

US 2025/0334705 A1 Oct. 30, 2025

(51) Int. Cl.
G01T 1/208 (2006.01)
E21B 47/07 (2012.01)
G01V 5/06 (2006.01)

(52) U.S. Cl.
CPC .............. G01T 1/208 (2013.01); E21B 47/07 (2020.05); G01V 5/06 (2013.01)

(58) Field of Classification Search
CPC ........... G01T 1/208; E21B 47/07; G01V 5/06
See application file for complete search history.

(56) References Cited

U.S. PATENT DOCUMENTS 4,918,314 A * 4/1990 Sonne ...................... G01V 5/10
250/369
5,266,883 A * 11/1993 Sharpe .................... G01T 1/185
250/374

5,461,230 A * 10/1995 Winemiller .............. G01V 5/04
250/261
5,525,797 A * 6/1996 Moake ...................... G01V 5/12
250/269.2
5,635,710 A * 6/1997 Reed ...................... E21B 47/017
250/374
9,024,264 B2 * 5/2015 Zhang ...................... G01T 1/208
250/363.03
2016/0025892 A1 * 1/2016 Sinclair .................... E21B 47/07
250/254
2016/0299251 A1 * 10/2016 Luo ........................... G01T 1/40
2017/0160404 A1 * 6/2017 Moteki ...................... G01T 1/40
2017/0276831 A1 * 9/2017 Galford .................... G01V 5/08
2025/0020820 A1 * 1/2025 Fruehauf ................... G01T 1/40

* cited by examiner

*Primary Examiner* — Hugh Maupin

(74) *Attorney, Agent, or Firm* — Campbell Stephenson LLP

(57) ABSTRACT

An apparatus includes a sensor to generate a light signal in response to receiving gamma radiation, and a photo multiplier tube (PMT) that receives the light signal and generates a corresponding PMT signal. A voltage source provides a supply voltage to the PMT. The magnitude of the PMT signal depends on a magnitude of the supply voltage. A temperature sensor generates a temperature signal with a magnitude that varies with a temperature sensed by the temperature sensor. The temperature sensed by the temperature sensor is substantially equal to a temperature of the PMT. A signal conditioner modifies the temperature signal. A control circuit coupled between the voltage source and the signal conditioner receives the modified temperature signal and generates a control signal for adjusting the magnitude of supply voltage based on the modified temperature signal.

22 Claims, 6 Drawing Sheets

TEMPERATURE COMPENSATION FOR PHOTOMULTIPLIER TUBE

BACKGROUND

This disclosure relates to the field of Logging While Drilling (LWD) tools and Measuring While Drilling (MWD) tools. LWD and MWD tools are particularly useful during oil and gas development and exploration. LWD and MWD tools can be used to take measurements and/or aid in geosteering while drilling for resources such as oil and gas. LWD and MWD tools are exposed to elevated temperatures. While LWD and MWD tools may be designed to operate in a specified temperature range, these tools may be subjected to temperatures outside the temperature range at many exploration sites, which may lead to questions about the reliability of data measured and/or collected by the tool during the drilling operation.

BRIEF DESCRIPTION OF THE DRAWINGS

The present technology may be better understood, and its numerous objects, features, and advantages made apparent to those skilled in the art by referencing the accompanying drawings.

Figure 1:
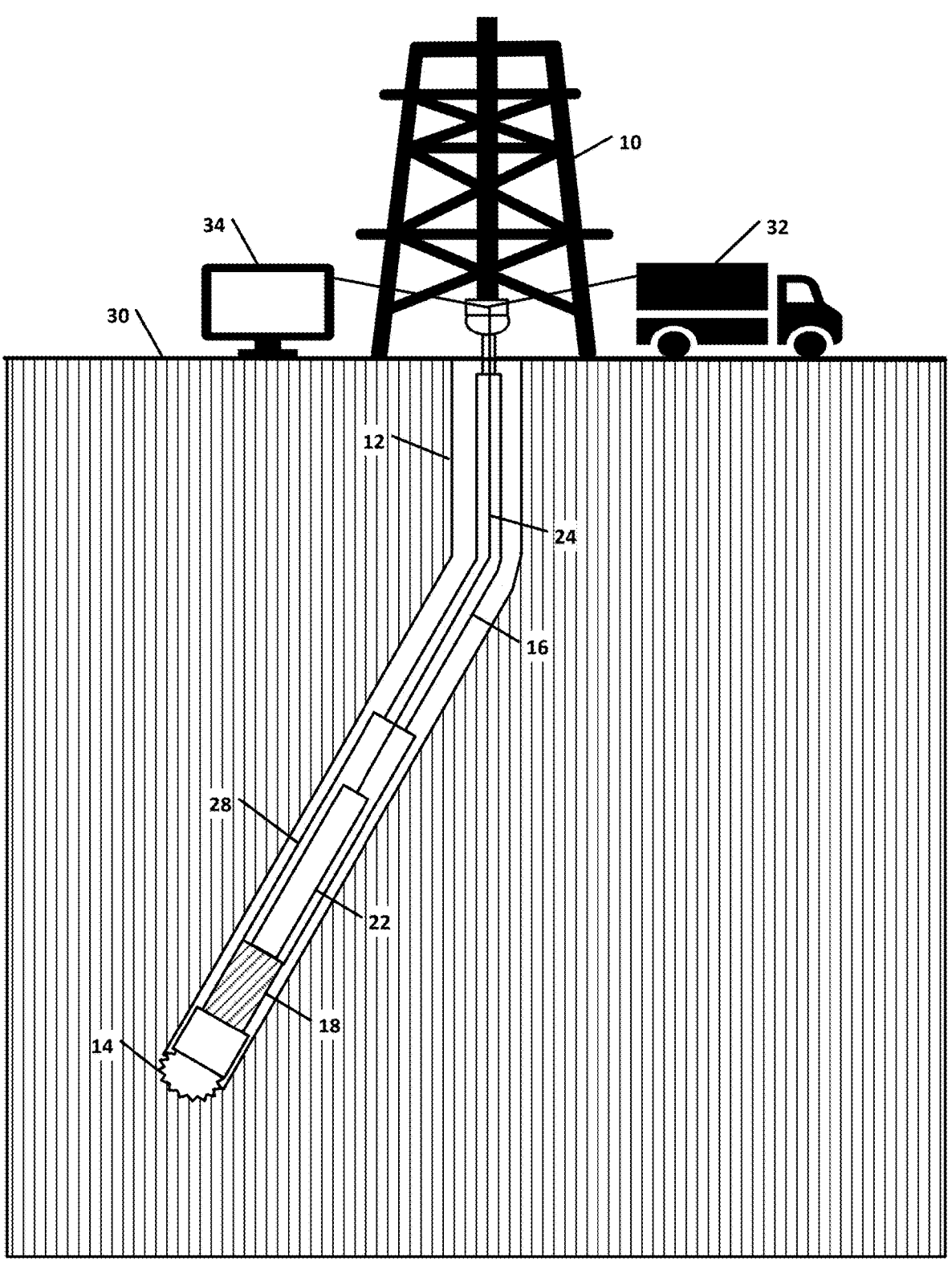
FIG. 1 illustrates a system used to drill a borehole, which includes a LWD tool.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention as defined by the appended claims.

DETAILED DESCRIPTION

Logging While Drilling and Measuring While Drilling are both techniques used in the oil and gas industry for gathering real-time data during the drilling process. MWD tools can be considered a category of LWD tools. For ease of explanation only the present disclosure will be explained with reference to LWD tools, it being understood the present disclosure should not be limited thereto.

FIG. 1 illustrates a drilling rig 10 to cut a borehole 12 into the earth, penetrating a subsurface geological formation. A drill string 16 passes through borehole 12 and is coupled to drilling rig 10. Drill string 16 may include drill bit 14, drill collars 28, and drill pipe.

The lowest part of drill string 16 includes drill collars 28 and drill bit 14. Drill collars 28 are heavy walled pipe that provide weight on drill bit 14 and strength to resist buckling. Drill pipe is thinner walled. Drill collars 28 may have radial projections (not shown) called stabilizers. Short drill collars, which may be adapted for specialized functions, are called "subs."

Drilling rig 10 can turn drill bit 14, which cuts through the rock at the bottom of borehole 12. In some situations, drilling rig 10 turns drill bit 14 by attaching drill bit 14 at the lower end of drill string 16 and turning drill string 16 with powered equipment at the surface. Alternatively, as shown in FIG. 1, drill bit 14 may be driven by motor 18, which is adjacent to drill bit 14 in borehole 12. The illustrated arrangement is known as a "steering tool" system, in which drill string 16 does not need to rotate to turn the drill bit. However, drill string 16 can be turned to steer drill bit 14, to control the direction of advance of borehole 12, thus permitting the route of borehole 12 to be precisely steered as desired through the subsurface geologic formation.

An LWD tool 22 is placed in drill string 16, near drill bit 14 (if LWD tool 22 is used for geo-steering, it may be desirable to locate LWD tool 22 as close as possible to drill bit 14). In a steered system, LWD tool 22 may be placed above motor 18, such that LWD tool 22 receives power and returns data to the surface through a wire line cable 24 that is passed down the center of a non-rotating (or slowly rotating) drill string 16. In a system that uses a rotating drill string 16 to turn drill bit 14, LWD tool 22 may be placed just above drill bit 14, and a mud pulse data telemetry system (or any other appropriate telemetry method) can be used to return information to the surface. Thus, LWD tool 22 may be operatively positioned in borehole 12, typically with an annular space (e.g., filled with drilling mud) between tool 22 and the borehole wall.

LWD tool 22 can incorporate or be associated with one or more directional sensors that provide directional information to the driller to assist in controlling the steering of the drill bit. Directional sensors can be calibrated to indicate the position of the LWD tool 22 relative to an absolute direction, such as the gravity vector or magnetic north.

LWD tool 22 can also incorporate one or more formation sensors that are each configured to measure a property of the geologic formation surrounding the borehole. These sensors can detect currents, magnetic fields, radiation, or some other characteristic that can be measured and used to determine information about the geologic formation, which may be useful to the drilling process. LWD tool 22 can incorporate or be associated with telemetry or other communication equipment to transmit this information to the earth's surface.

As described in more detail below with respect to FIGS. 2 and 3, LWD tool 22 can incorporate one or more sensors. The present disclosure will be described with reference to formation sensors (hereinafter "sensors"), it being understood the present disclosure should not be limited thereto. Finally, LWD tool 22 can incorporate or may be associated with a processing module and one or more storage devices to process and store measurements obtained using the sensors.

Above the earth's surface 30, telemetry receivers and/or other appropriate communication equipment can be in a logging truck 32 located near drilling rig 10. Thus, communication equipment is positioned to receive and interpret geologic information generated by LWD tool 22 and its sensors, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the formation properties of the geologic formation currently near LWD tool 22. In one embodiment, data display panel 34 can be part of a computing device (e.g., data display panel 34 can be rendered on the screen of a laptop computer used by an operator of drilling rig 10).

Formation sensors may take form in radiation sensors, it being understood the term formation sensor should not be limited thereto. Radiation sensors may be added to LWD 22 and designed to sense gamma photons emitted by a radioactive source near LWD 22. This may be very useful in drilling because it allows the identification of rock types by detecting known naturally occurring isotopes that emit gamma photons, such as uranium, potassium, and thorium. Detecting rock types (based upon the detected isotopes) in turn allows an operator to adjust the course of drilling if needed.

One type of radiation sensor uses one or more scintillation crystals, which detect gamma radiation by converting incident gamma photons into brief flashes of light (hereinafter light signals). A typical example is a single crystal or a series of crystals of sodium iodide doped with thallium. Other types of gamma sensors are contemplated. A photomultiplier tube (PMT) can convert incident light signals from an optically coupled gamma sensor into electrical pulse signals (hereinafter PMT signals).

PMTs may contain a photocathode, series connected dynodes, and an anode. Each dynode can be held at a more positive voltage, around 100 Volts, than the preceding one. Photons of a light signal from a gamma sensor may strike the photocathode to create a small group of primary electrons through a photoelectric effect. The number of primary electrons in the initial group may be proportional to the energy of the incident light signal. The primary electrons may move toward the first dynode by an electric field. They each arrive with around 100 eV. Upon striking the first dynode, more low energy electrons are emitted, and these electrons are in turn accelerated toward the second dynode. The geometry of the dynode chain is such that a cascade occurs with an exponentially increasing number of electrons being produced at each stage. The last stage is called the anode. The electrons reaching the anode results in a current pulse that is convertible into the PMT signal. A substantial supply voltage (e.g., 1200 Volts) may be needed across the series connected dynodes for the PMT to operate properly.

LWD tools may employ signal threshold detectors to detect PMT signals from the PMT. The detected PMT signals can be counted to calculate a rate at which PMT signals are generated. The rate provides useful information about the geological formation surrounding the LWD. Signal threshold detectors detect PMT signals with a voltage that exceeds a minimal level to filter out those PMT signals that are not considered reliable. PMT signals are usually very weak, however, and amplification may be necessary if the PMT signals are to be reliably detected and subsequently counted.

Devices such as gamma sensors and PMTs can be defined by "gains" among other parameters. In general device gain may be defined as a ratio of an output signal amplitude to an amplitude of a corresponding input signal. Gain may also be defined as a measure of how much the output signal changes compared to the input signal.

Gains of gamma sensors and PMTs may change with the temperature at which they operate. PMTs exhibit a decrease in gain as the temperature rises, which can negatively impact the overall performance of LWDs. As the PMT temperature rises, the PMT signal it generates weakens to the point it may not be detectable by a signal threshold detector even after amplification. However, the gain of a PMT can be increased by increasing the supply voltage provided to it. So it makes sense to increase the supply voltage when the temperature of the PMT increases.

Figure 2:
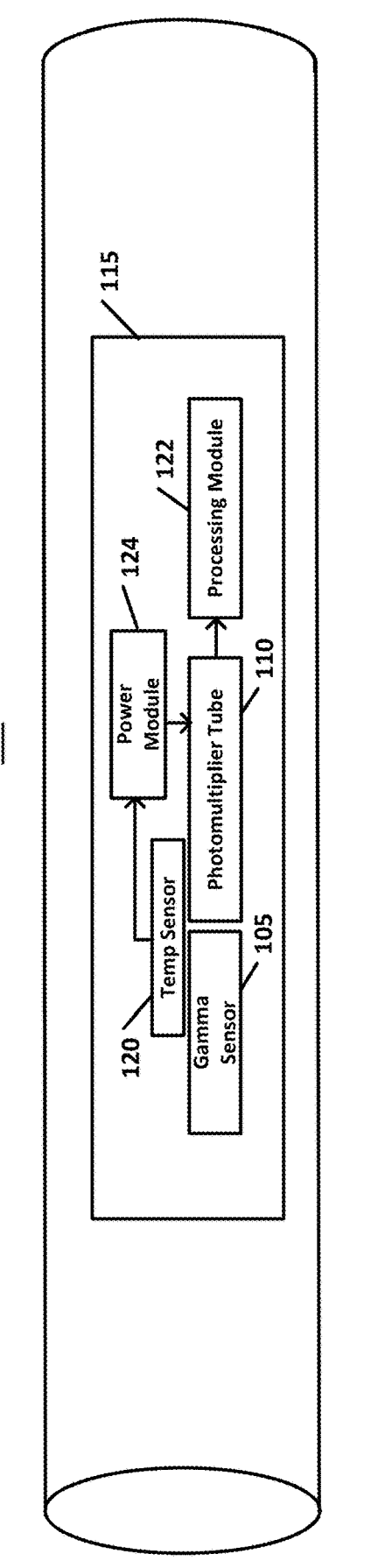
FIG. 2 illustrates an LWD tool with relevant components for measuring gamma radiation during a drilling operation.

FIG. 2 shows an example LWD tool 22 that illustrates relevant components within enclosed package 115. A gamma sensor (e.g., scintillation crystal) 105 is in optical communication with a PMT 110. A temperature sensor 120 is placed within package 115 along with gamma sensor 105 and PMT 110. Temperature sensor 120 can be fastened to PMT 110 using a fastener such as a heat conductive silicone rubber material. Temperature sensor 120 should be proximately located to gamma sensor 105 and/or PMT 110 to experience substantially the same temperature as crystal 105 and/or photomultiplier 110 during a drilling operation. A temperature sensor 120 provides a temperature signal to a power module 124, which in turn provides a temperature-compensated supply voltage to PMT 110. A processing module 122 receives PMT signals from PMT 110.

Figure 3:
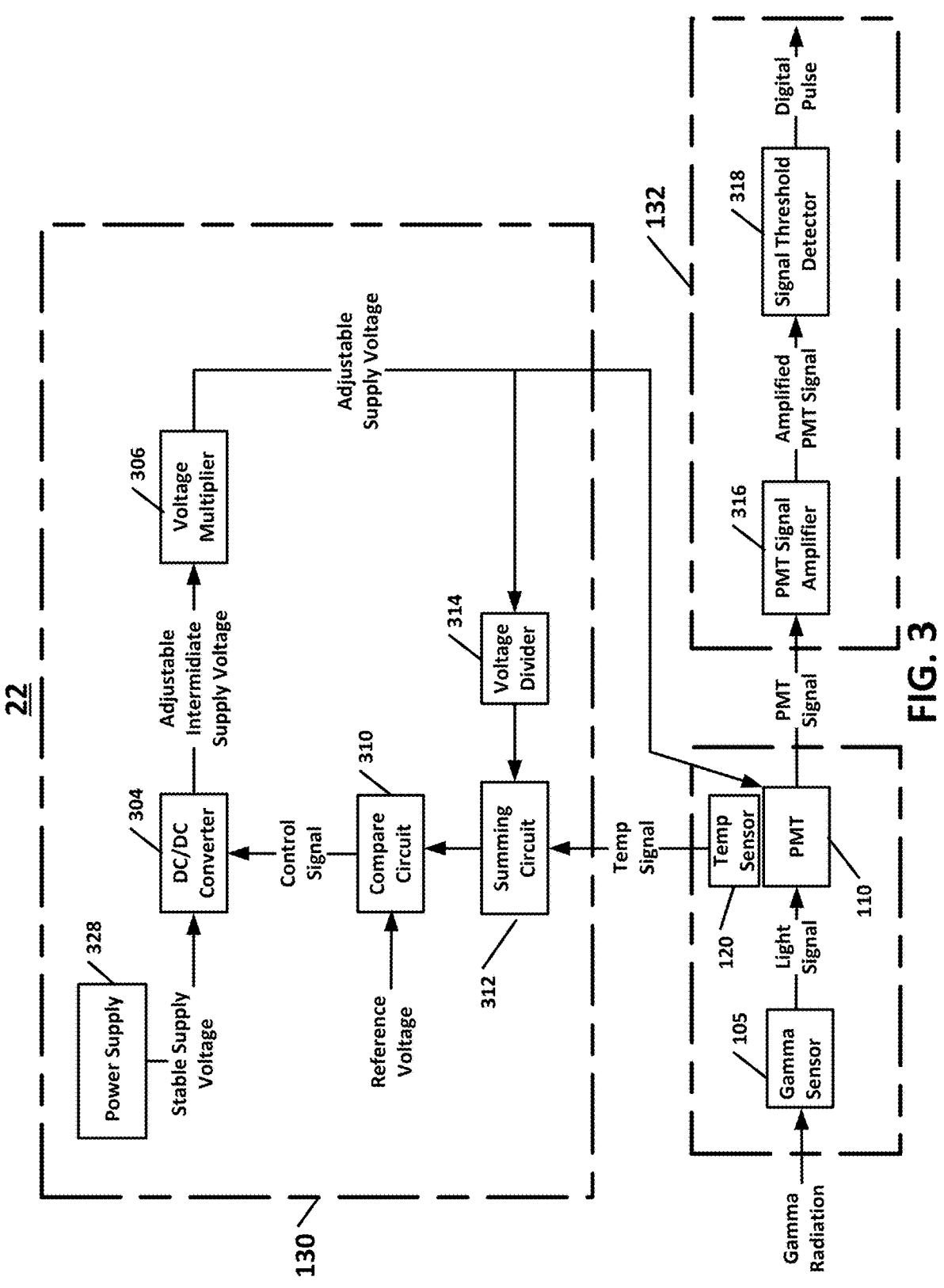
FIG. 3 illustrates relevant components of the LWD tool shown in FIG. 2.

With continuing reference to FIG. 2, FIG. 3 shows relevant components of power module 124 and processing module 122. Power module 124 includes a printed circuit board (PCB) 130 upon which components can be mounted. Processing module 122 also includes a PCB 132 upon which components can be mounted.

PBC 132 is configured to receive a PMT signal from PMT 110. PCB 132 includes a PMT signal amplifier 316 and a signal threshold detector 318 in data communication through metal PCB traces. Amplifier 316 receives and amplifies the PMT signal. The amplified PMT signal is then provided to signal threshold detector 318, which generates a digital pulse if the amplitude of the amplified PMT signal exceeds a predetermined voltage threshold. The digital pulse can be further processed or stored by components not shown in FIG. 3. PCB 132 may include additional components (not shown) such as an adjustable pulse lockout circuit and a pulse counter.

LWD tool 22 also includes a PCB 130, which includes relevant components of a feedback-controlled, temperature-compensated voltage supply (hereinafter adjustable voltage supply). PMT 110 receives the adjustable supply voltage from PCB 130. The gain of PMT 110 increases with an increase in the adjustable supply voltage.

PCB 130 is configured to receive a temperature signal from temperature sensor 120. PCB 130 is configured to provide an adjustable supply voltage to PMT 110. As will be more fully described, PCB 130 implements a feedback loop for maintaining the adjustable supply voltage based on the temperature signal generated by temperature sensor 120; as the temperature of PMT 110 increases, the magnitude of the temperature signal increases linearly, and as a result adjustable supply voltage increases linearly.

PCB 130 includes multiple components electrically connected through metal PCB traces. A power supply 328 provides a stable supply voltage to a DC/DC converter 304. The stable supply voltage is maintained at a substantially constant voltage value. DC/DC converter 304 generates an adjustable intermediate supply voltage based upon the stable supply voltage input and a control signal received from a comparator 310. A voltage multiplier 424 receives the adjustable intermediate supply voltage from DC/DC converter 304. Voltage multiplier 424, as its name implies, multiplies the adjustable intermediate supply voltage by a predetermined factor (e.g., 10) to generate the adjustable supply voltage that is provided to and used by PMT 110. In addition to providing the adjustable supply voltage to PMT 110, the adjustable supply voltage is provided to a voltage divider 314, which in turn divides the adjustable supply voltage by a predetermined factor (e.g., 10). A summing circuit 312 receives the temperature signal from sensor 120 and the divided adjustable supply voltage from voltage divider 314. Summing circuit 312, as its name implies, sums the temperature signal and output from voltage divider 314, both of which may be analog signals. The summed voltage is compared with a reference voltage by comparator circuit 310. The reference voltage is substantially constant and provided by a circuit (not shown). Comparator circuit 310 generates a control signal for controlling DC/DC converter 304 based upon a comparison of the reference voltage to the output of summing circuit 310. If the output of summing circuit 312 exceeds the reference voltage, compare circuit 310 decreases the magnitude of the control signal provided to DC/DC converter 304. If reference voltage exceeds the output of summing circuit 312, as would be the case when the temperature signal increases, compare circuit 310 increases the magnitude of the control signal provided to DC/DC converter 304. DC/DC converter 304 adjusts the magnitude of adjustable intermediate supply voltage, which in turn adjusts the magnitude of the adjustable supply voltage, based upon the control signal it receives from compare circuit 310. If the magnitude of control signal increases, DC/DC converter 304 increases the magnitude of the adjustable supply voltage. If the magnitude of the control signal decreases, DC/DC converter decreases the magnitude of adjustable supply voltage. In an alternative, if the magnitude of control signal increases, DC/DC converter 304 decreases the magnitude of the adjustable supply voltage, and if the magnitude of the control signal decreases, DC/DC converter increases the magnitude of adjustable supply voltage. In the steady state the magnitude of adjustable supply voltage remains substantially constant.

PMTs play a crucial role in LWDs, converting incident light signals from gamma sensors into electrical signals. Gamma sensors and PMTs may be subjected to extreme environmental conditions during the drilling process, including high temperatures. The gains of gamma sensors and PMTs may change with a change in their temperature. The gains of gamma sensors and PMTs may not change at the same rate when their temperatures increase or decrease. The gain of a PMT may decrease substantially more than the gain of a gamma sensor as the temperature of both devices increase equally. This disparity in gain change with temperature creates a problem especially when the two devices operate at high temperatures (e.g., 170, 180, 190, 195, 200 Celsius or more). While LWD tool 22 may provide relatively accurate information about the surrounding geological formation it is in when the temperature of the gamma sensor 105 and PMT 110 is below, for example, 170 Celsius, the accuracy of information substantially degrades when the temperature of the gamma sensor 105 and PMT 110 exceeds, for example, 170, 180, 190, 195, 200 Celsius or more.

To address this issue, a dynamically compensated voltage supply system is proposed. The system supplies a voltage to the PMT that is dynamically adjusted based on the temperature of the PMT. One key innovation lies in modifying (e.g., boosting) the temperature signal from a temperature sensor before it is used to adjust the voltage supply, ensuring a more proportional and effective compensation for a decrease in PMT gain with temperature. Implementing a dynamically controlled voltage supply based on modifying (e.g., boosting) the temperature signal can help maintain consistent generation of reliable PMT signals while the LWD tool is operating in a high temperature environment.

Figure 4:
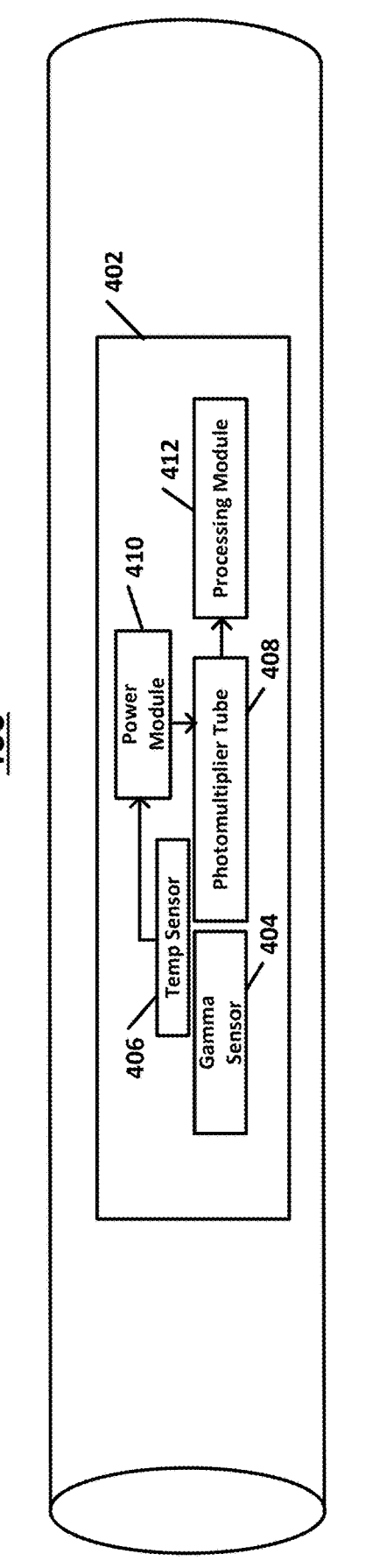
FIG. 4 illustrates relevant components of an example LWD tool employing one embodiment of the present disclosure.

FIG. 4 illustrates relevant components of an example LWD tool 400 employing one embodiment of the present disclosure. LWD tool 400 includes a cylindrical housing 402 that contains a gamma sensor 404 in optical communication with a PMT 408. A temperature sensor 406 can be fastened to PMT 408 using a fastener such as a heat conductive silicone rubber material. Temperature sensor 406 should be proximately located to gamma sensor 404 and/or PMT 408 to experience substantially the same temperature as sensor 404 and/or PMT 408 during a drilling operation. Temperature sensor may be a silicon band-gap temperature sensor in which a voltage drop across a forward-biased silicon diode, operated at a constant current, changes at a constant rate with changing temperature. Other types of sensors, including thermocouples or thermistors, are contemplated. Housing 402 also contains power module 410 and processing module 412. Temperature sensor 406 provides a temperature signal to a power module 410, which in turn provides a dynamically compensated supply voltage to PMT 408. PMT 408 provides PMT signals to processing module 412.

Figure 5:
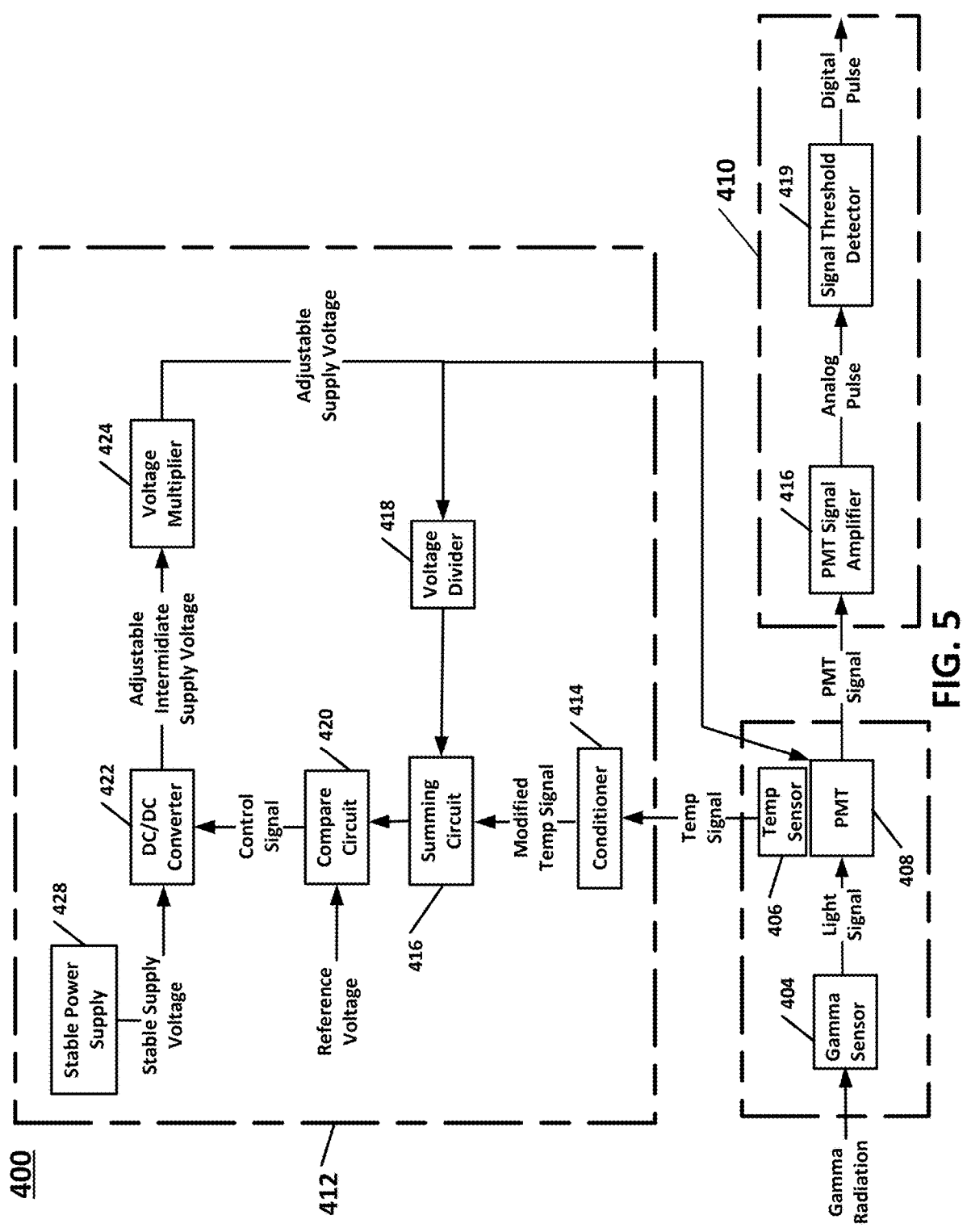
FIG. 5 illustrates relevant components of the LWD tool shown in FIG. 4.

With continuing reference to FIG. 4, FIG. 5 shows relevant components of power module 410 and processing module 412. More specifically, power module 410 includes a PCB 412 upon which components can be mounted. Processing module 412 also includes a PCB 410 upon which components can be mounted.

PMT 408 converts light signals it receives from gamma sensor 404 into PMT signals. The amplitude or magnitude of the PMT signal may depend upon; the magnitude of the light signal received by PMT 408 from gamma sensor 404, and the temperature of PMT 408. The magnitude of PMT signals may decrease as the operating temperature of PMT 408 increases given the same input light signal magnitude. In other words, the gain of PMT 408 may decrease with an increase in operating temperature all other factors being equal. The decrease may not be linear. Light signals generated by gamma sensor 404 may also depend upon the temperature at which it operates. For example, the magnitude of light signals generated by gamma sensor 404 may decrease as the temperature of gamma sensor 404 increases given the same input gamma radiation magnitude. In other words, the gain of gamma sensor may decrease with an increase in operating temperature all other factors being equal. Like the PMT, the decrease may not be linear. Moreover, the rate at which the PMT signal strength decreases with temperature may be different than the rate at which the light signal strength decreases with temperature. The decrease in gain with temperature in PMT 408 or gamma sensor 404 can reduce the magnitude of the PMT signal output to a level that cannot be detected. If the gains of both the PMT 408 and the gamma sensor 404 decrease with temperature, the adverse effect on PMT signal strength may be compounded.

PBC 410 is configured to receive the PMT signal from PMT 408. PMT signal amplifier 416 amplifies the PMT signal to create an amplified PMT signal. A signal threshold detector 419 receives the amplified PMT signal and generates a digital pulse signal in response. In one embodiment, the leading edge of the digital pulse signal is triggered when signal threshold detector 419 determines that amplified PMT signal has an amplitude that exceeds a threshold value. The falling edge of the digital pulse occurs when threshold detector 419 detects that the amplified PMT signal amplitude or magnitude falls below the threshold. The width of the digital pulse depends upon the time at which amplified PMT signal is above the threshold value set within the signal threshold detector 419. PCB 410 may include additional components (not shown) such as an adjustable pulse lockout circuit, a pulse counter, data storage, etc.

PCB 412 includes a temperature signal conditioner 414. As will be more fully described below, conditioner 414 modifies the temperature signal provided by temp sensor 406 before it is provided to a feedback control loop that controls a voltage supplied to PMT 406. The modified signal is used to ensure a more proportional and effective compensation for the decrease in gain in PMT 408 with temperature. In one embodiment, conditioner 414 modifies the temperature signal by amplifying the temperature signal. The temperature signal can be amplified by a constant factor. In another embodiment, the temperature signal can be amplified by factor that varies with temperature.

Conditioner 414 may take any one of many different forms. For example, conditioner 414 may take form in an analog circuit. Or conditioner 414 may include a microprocessor and memory where the microprocessor executes instructions stored in the memory. The microprocessor may receive digital equivalent of the temperature signal from temp sensor 406. A look-up can be developed beforehand and stored in the memory that correlates temperature values with corresponding PMT gain adjustments. When the temperature changes, the microprocessor can refer to the look-up table to apply the appropriate gain correction to the temperature signal. The microprocessor can use the mapped correction to modify the temperature signal before it is converted into an analog signal and provided to summing circuit 420. One embodiment of conditioner 414 will be more fully described below.

PCB 412 further includes a dynamically controlled voltage source (DCVS) with feedback, which provides an adjustable supply voltage for correcting the gain of PMT 408. The DCVS includes multiple components in electrical communication with each other through metal traces on PCB 412. DCVS includes a power supply 428 that provides a stable supply voltage to DC/CD converter 422. Power supply 428 regulates the stable supply voltage to a specific level, usually within a narrow tolerance range. Power supply 428 may have a quick and effective response to changes in its operating conditions such as temperature or input voltage, or in response to changes in its load. Power supply 428 may be a linear voltage regulator, a switched voltage regulator, etc. DC/DC converter 422 can generate an adjustable intermediate supply voltage based upon the stable supply voltage input and a control signal received from a comparator circuit 420. The stable supply voltage is provided by a device (not shown) and maintained at a substantially constant voltage value. The DCVS also includes a voltage multiplier 424 that receives the adjustable intermediate supply voltage from DC/DC converter 422. Voltage multiplier 424, as its name implies, multiplies the adjustable intermediate supply voltage by a predetermined factor (e.g., 10) to generate adjustable supply voltage. In addition to providing the adjustable supply voltage to PMT 408, the adjustable supply voltage is provided to a voltage divider 418, which in turn divides the adjustable supply voltage by a predetermined factor (e.g., 10). A summing circuit 416 receives the modified temperature signal from conditioner 414 and the divided adjustable supply voltage from voltage divider 418. Summing circuit 416, as its name implies, sums the modified temperature signal and divided adjustable supply voltage, both of which may be analog signals. Comparator 420 compares the summed voltage with a reference voltage. The reference voltage is substantially constant and provided by a circuit (not shown). Comparator circuit 420 generates a control signal for controlling DC/DC converter 422 based upon a comparison of the reference voltage to the output of summing circuit 416. If the output of summing circuit 416 exceeds the reference voltage, compare circuit 420 decreases the magnitude of the control signal provided to DC/DC converter 422. If reference voltage exceeds the output of summing circuit 416, compare circuit 420 increases the magnitude of the control signal provided to DC/DC converter 422. DC/DC converter 422 adjusts the magnitude of adjustable intermediate supply voltage based upon the control signal it receives from compare circuit 420. If the magnitude of control signal increases, DC/DC converter 422 increases the magnitude of the adjustable intermediate supply voltage, which in turn increases the adjustable supply voltage for PMT 408, which in turn increases the gain of PMT 408. If the magnitude of the control signal decreases, DC/DC converter decreases the magnitude of adjustable intermediate supply voltage, which in turn decreases the adjustable supply voltage for PMT 408, which in turn decreases the gain of PMT 408. Alternatively, if the magnitude of control signal increases, DC/DC converter 422 decreases the magnitude of the adjustable intermediate supply voltage, which in turn increases the adjustable supply voltage for PMT 408, which in turn increases the gain of PMT 408, and if the magnitude of the control signal decreases, DC/DC converter increases the magnitude of adjustable intermediate supply voltage, which in turn decreases the adjustable supply voltage for PMT 408, which in turn decreases the gain of PMT 408. Thus, a feedback loop may be created for maintaining the adjustable supply voltage provided to PMT 408 based on the modified temperature signal generated by conditioner 414. In the steady state, the temperature output from temperature sensor 406 is constant, and as a result the adjustable supply voltage is constant.

Figure 6:
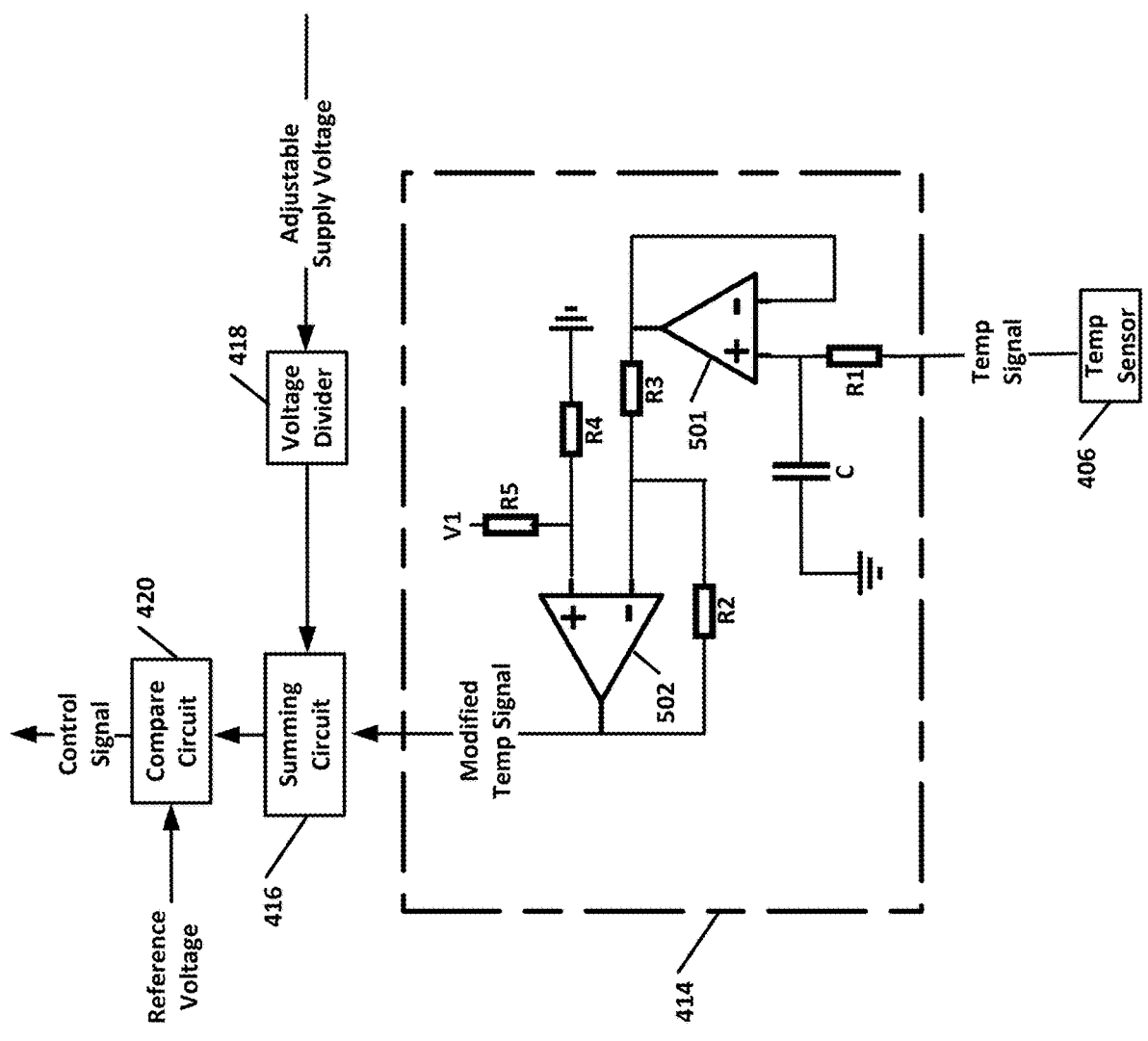
FIG. 6 illustrates relevant components of an example compensation circuit shown in FIG. 5.

Conditioner 414 modifies the temperature signal from temperature sensor 420. FIG. 6 illustrates an example conditioner according to one embodiment of the present disclosure. Conditioner 414 includes op-amps 501 and 502, resistors R1-R5, and capacitor C. Voltage V1 is connected to the non-inverting input of op-amp 502 via the voltage divider of R5 and R4. Temperature signal from temperature sensor 406 is received at the non-inverting input of op-amp 501 via resistor R1. Op-amp 501 may be configured as a unity gain buffer and provides a buffered temperature signal to the inverting input op-amp 502 via resistor R3. Op-amp 501 may invert the polarity of the temperature signal. Op-amp 502 may be configured as a differential amplifier when the resistances of R4 and R3 are equal, and the resistances of R2 and R5 are equal. Op-amp 502 amplifies a difference between the buffered temperature signal and V1 to generate the modified temperature signal, which is subsequently provided to summing circuit 416. In one embodiment, modified temperature signal VMtemp is proportional to R2/R3 (V1–Vtemp), where Vtemp is the buffered temperature signal. In this embodiment, Vtemp increases linearly with a linear increase in the temperature sensed by temperature sensor 420. If Vtemp increases, VMtemp decreases, which causes the output of summing circuit 416 to decrease, which in turn causes the magnitude of the control signal to increase. As the magnitude of the control signal increases, the adjustable supply voltage increases, and the adjustable supply voltage continues to increase until the sum of VMtemp and the divided output voltage from voltage divider 418 equals the reference voltage.

Compensating for gain change with temperature of a gamma sensor, a PMT, or compensating for a combined gain change of the gamma sensor and the PMT, involves implementing a strategy to maintain a consistent measurement gamma radiation despite temperature variations. The present disclosure provides a method and apparatus of using a temperature sensor near the PMT to monitor temperature changes. Temperature signals from the temperature sensor can be used to dynamically adjust the gain settings of the PMT in real-time to help maintain a consistent PMT signal output despite temperature variations.

Although the present disclosure has been described in connection with several embodiments, the disclosure is not intended to be limited to the specific forms set forth herein. On the contrary, the present disclosure is intended to cover such alternatives, modifications, and equivalents as can be reasonably included within the scope of the disclosure as defined by the appended claims.

What is claimed is:

1. An apparatus comprising:
a gamma sensor configured to generate a light signal in response to receiving gamma radiation;
a photo multiplier tube (PMT) in optical communication with the gamma sensor, wherein the PMT is configured to receive the light signal and generate a PMT signal in response to receiving the light signal;
a voltage source coupled to the PMT and configured to provide a supply voltage to the PMT, wherein a magnitude of the PMT signal depends on a magnitude of the supply voltage;
a temperature sensor positioned near the PMT and configured to generate a temperature signal with a magnitude that varies with a temperature sensed by the temperature sensor, wherein the temperature sensed by the temperature sensor is substantially equal to a temperature of the PMT;
a signal conditioner configured to modify a magnitude of the temperature signal to create a modified temperature signal;
a control circuit coupled between the voltage source and the signal conditioner;
wherein the control circuit is configured to receive the modified temperature signal and generate a control signal for adjusting the magnitude of supply voltage based on the modified temperature signal;
wherein the signal conditioner comprises:
a first op-amp configured as a unity gain buffer for generating a buffered temperature signal as a function of the temperature signal;
a second op-amp configured as a differential amplifier for generating the modified temperature signal as a function of the buffered temperature signal.

2. The apparatus of claim 1 wherein the control circuit generates the control signal with a magnitude that is dependent on a magnitude of the modified temperature signal.

3. The apparatus of claim 1 wherein the temperature signal comprises a voltage signal, and wherein the signal conditioner is configured to amplify a difference between the temperature signal and a predetermined voltage to generate the modified temperature signal.

4. The apparatus of claim 1 wherein the temperature signal comprises a voltage signal, and wherein the signal conditioner is configured to attenuate the temperature signal.

5. The apparatus of claim 1 wherein the magnitude of the PMT signal depends on the temperature of the PMT.

6. The apparatus of claim 1 wherein the magnitude of the PMT signal generated by the PMT depends on a magnitude of the light signal.

7. The apparatus of claim 1 further comprising a cylindrical housing that contains the gamma sensor, the PMT, the temperature sensor, the control circuit, the signal conditioner, and the voltage supply.

8. The apparatus of claim 1 wherein the control circuit comprises:
a summing circuit for adding the modified temperature signal and a divided version of the supply voltage to generate an added signal;
a compare circuit for comparing the added signal to a reference voltage;
wherein the compare circuit generates the control signal in response to comparing the added signal to the reference voltage.

9. A method comprising:
a gamma sensor generating a light signal in response to receiving gamma radiation;
a photo multiplier tube (PMT) receiving the light signal and generating a PMT signal in response to receiving the light signal;
supplying a voltage to operate the PMT, wherein a magnitude of the PMT signal depends on a magnitude of the supplied voltage;
a temperature sensor generating a temperature signal with a magnitude that depends on a temperature sensed by the temperature sensor, wherein the temperature sensed by the temperature sensor is substantially equal to a temperature of the PMT;
modifying the temperature signal;
adjusting the magnitude of supply voltage based on a magnitude of the modified temperature signal;
wherein modifying the temperature signal comprises:
a first op-amp generating a buffered temperature signal as a function of the temperature signal;
a second op-amp generating the modified temperature signal as a function of the buffered temperature signal.

10. The method of claim 9 wherein the temperature signal comprises a voltage signal, and wherein the modified temperature signal is generated by amplifying a difference between the temperature signal and a predetermined voltage.

11. The method of claim 9 wherein the temperature signal comprises a voltage signal, and wherein the modified temperature signal is generated by attenuating the temperature signal.

12. The method of claim 9 wherein the magnitude of the PMT signal depends on the temperature of the PMT.

13. The method of claim 9 wherein the magnitude of the PMT signal generated by the PMT depends on a magnitude of the light signal.

14. An apparatus comprising:
a gamma sensor configured to generate a light signal in response to receiving gamma radiation;
a photo multiplier tube (PMT) in optical communication with the gamma sensor, wherein the PMT is configured to receive the light signal and generate a PMT signal in response to receiving the light signal;
a voltage source coupled to the PMT and configured to provide a supply voltage to the PMT, wherein a magnitude of the PMT signal depends on a magnitude of the supply voltage;
a temperature sensor positioned near the PMT and configured to generate a temperature signal with a magnitude that varies with a temperature sensed by the temperature sensor, wherein the temperature sensed by the temperature sensor is substantially equal to a temperature of the PMT;
a signal conditioner configured to modify a magnitude of the temperature signal to create a modified temperature signal;

a control circuit coupled between the voltage source and the signal conditioner;

wherein the control circuit is configured to receive the modified temperature signal and generate a control signal for adjusting the magnitude of supply voltage based on the modified temperature signal;

wherein the control circuit comprises:

a summing circuit for adding the modified temperature signal and a divided version of the supply voltage to generate an added signal;

a compare circuit for comparing the added signal to a reference voltage;

wherein the compare circuit generates the control signal in response to comparing the added signal to the reference voltage.

15. The apparatus of claim 14 wherein the control circuit generates the control signal with a magnitude that is dependent on a magnitude of the modified temperature signal.

16. The apparatus of claim 14 wherein the temperature signal comprises a voltage signal, and wherein the signal conditioner is configured to amplify a difference between the temperature signal and a predetermined voltage to generate the modified temperature signal.

17. The apparatus of claim 14 wherein the temperature signal comprises a voltage signal, and wherein the signal conditioner is configured to attenuate the temperature signal.

18. The apparatus of claim 14 wherein the magnitude of the PMT signal depends on the temperature of the PMT.

19. The apparatus of claim 14 wherein the magnitude of the PMT signal generated by the PMT depends on a magnitude of the light signal.

20. The apparatus of claim 14 further comprising a cylindrical housing that contains the gamma sensor, the PMT, the temperature sensor, the control circuit, the signal conditioner, and the voltage supply.

21. The apparatus of claim 14 wherein the signal conditioner comprises:

a first op-amp configured as a unity gain buffer for generating a buffered temperature signal as a function of the temperature signal;

a second op-amp configured as a differential amplifier for generating the modified temperature signal as a function of the buffered temperature signal.

22. The apparatus of claim 14 wherein the signal conditioner comprises:

an analog-to-digital converter for converting the temperature signal into a digital equivalent;

a data processing unit that is configured to process the digital equivalent to generate a digital equivalent of the modified temperature signal in response to the data processing unit executing instructions stored in memory, and;

a digital-to-analog converter for converting the digital equivalent of modified temperature signal into the modified temperature signal.

\*   \*   \*   \*   \*